(No Model.)
F. S. HODGMAN.
BEARING FOR BICYCLES.
No. 420,722. Patented Feb. 4, 1890.
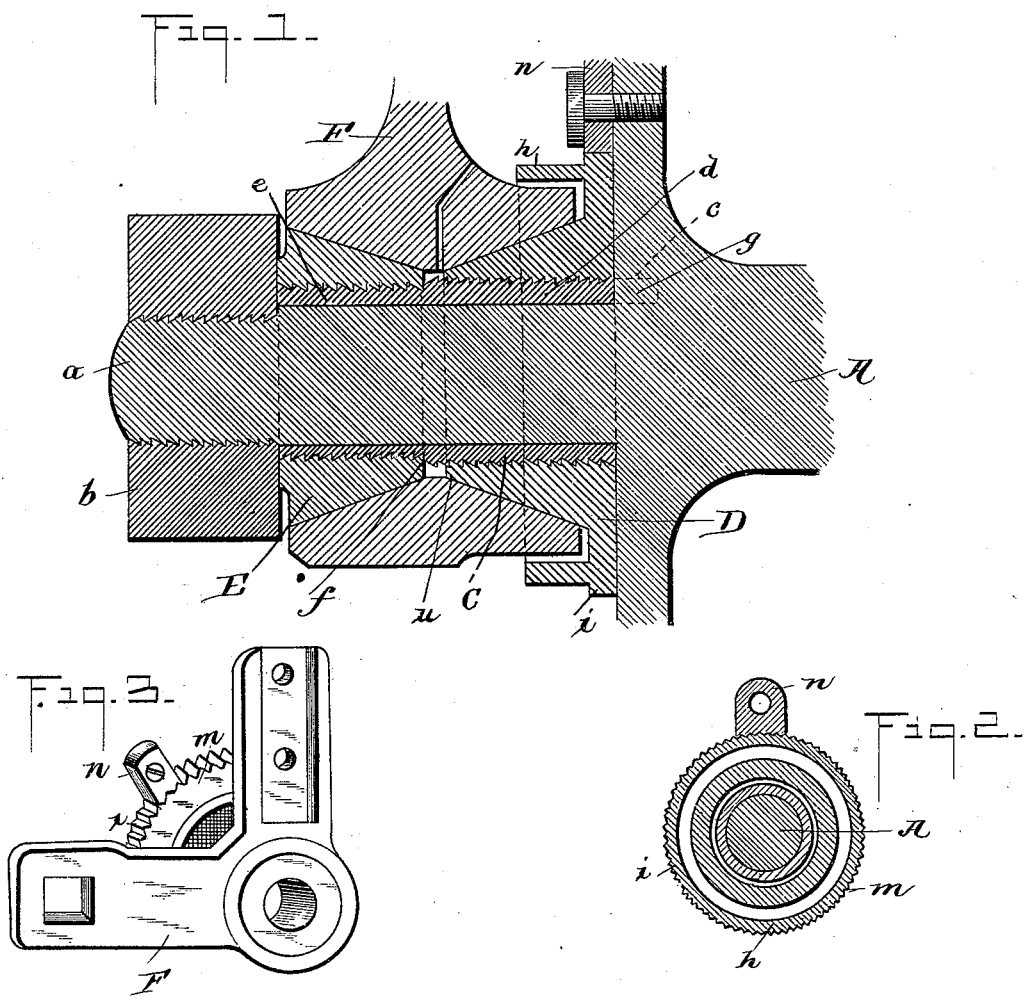

UNITED STATES PATENT OFFICE.

FRANK S. HODGMAN, OF TOLEDO, OHIO, ASSIGNOR TO THE LOZIER & YOST BICYCLE MANUFACTURING COMPANY, OF SAME PLACE.

BEARING FOR BICYCLES.

SPECIFICATION forming part of Letters Patent No. 420,722, dated February 4, 1890.

Application filed November 20, 1889. Serial No. 330,985. (No model.)

*To all whom it may concern:*

Be it known that I, FRANK S. HODGMAN, a citizen of the United States, residing at Toledo, in the county of Lucas and State of Ohio, have invented certain new and useful Improvements in Adjustable Cone-Bearings for Bicycles; and I do hereby declare the following to be a full, clear, and exact description of the invention, such as will enable others skilled in the art to which it appertains to make and use the same.

This invention relates to certain new and useful improvements in adjustable cone-bearings for bicycles and like vehicles; and it consists, substantially, in such features of construction, arrangement, and combinations of parts as will hereinafter be more particularly described, and pointed out in the claims.

The object of the invention is to provide an adjustable cone-bearing for bicycles and like vehicles, which shall enable ready adjustments being made to suit varying requirements, and also to compensate for wear of the parts.

A further object of the invention is to provide an adjustable cone-bearing for bicycles and like vehicles which shall permit of adjustment without removal or disconnection of parts, all as will more fully hereinafter appear when taken in connection with the accompanying drawings, wherein—

Figure 1 represents an enlarged longitudinal sectional view of an adjustable cone-bearing constructed in accordance with my invention, the same being shown as applied to the axle of a bicycle or similar vehicle. Fig. 2 is a cross-section on the line $xx$, and Fig. 3 is a view in perspective to better illustrate the locking device for the adjusting-cone.

In carrying my invention to effect I provide the ends of the axle for a suitable distance of a somewhat smaller diameter, and screw-thread such portions, so as to adapt them to receive a spur-gear or crank, according to how the machine is to be propelled, and either formed with or attached to said axle is the usual hub to which the inner ends of the wheel-spokes are secured.

Snugly fitting upon the axle and locked to the hub is a suitable sleeve, which is employed to receive a positively-set cone and an adjustable cone, as hereinafter more specifically referred to, the said sleeve for about one-half of its length being cut lower on its outer surface than the remaining portion, and both the raised and sunken surfaces are screw-threaded in opposite directions, the raised portion receiving the adjusting-cone and the sunken portion the positively-set cone.

By constructing the axle-sleeve in the manner explained the positive cone may be screwed up and forced against the shoulder or step formed by the variation in diameters of the two screw-threaded portions, thus making the connection permanent between said cone and sleeve. The thread on the smaller portion of the sleeve is of course cut in an opposite direction to the application of friction, so as to prevent unscrewing of the positive cone when power is applied to drive the machine.

Reference being had to the several parts of the drawings by the letters marked thereon, A represents the axle of a bicycle, the same having each end (but one end being shown) reduced in diameter at $a$ and screw-threaded to receive a spur-gear $b$, through the medium of which the machine is propelled.

B represents the usual hub, to which the inner ends of the wheel-spokes are designed to be secured, which hub has formed in its side an orifice $c$ for receiving the locking-pin on the end of the axle-sleeve, and the said hub may be either formed with or attached securely to the axle.

C represents a sleeve snugly fitting over the axle A, the same having a bore of equal diameter throughout, but having its thickness reduced for about one-half its length by cutting from its exterior surface, thus leaving an enlarged portion $d$ and a reduced portion $e$, the former portion being screw-threaded in one direction to receive the adjusting-cone D, as shown, and the latter portion being screw-threaded in an opposite direction (opposite to the application of friction) to receive the permanently-set cone E. The difference in the thickness of the two portions of the axle-sleeve creates an annular shoulder $f$, up against which the positive cone may be forced, thus making permanent the relationship between the several parts. The inner end of the axle-sleeve is formed with a pin or key g, which enters the orifice c in the side of the hub, as shown, thus locking said sleeve to the hub.

The adjusting-cone D is further formed or provided with an annular rim or flange h, which extends over to form a cap to prevent the ingress of dust, and the said cone is also milled or serrated, as at m, on the outer surface of that portion i thereof which abuts against the side of the hub, the purpose of which is to enable the same to be engaged by a lock-nut n, secured to the side of the hub by a screw, as shown, and thereby be held to any position of adjustment to which said cone may be brought. The lock-nut in question is milled or serrated on its under side, as shown, and is so shaped as to form a lock when properly set and secured.

When the axle-sleeve, positive cone, and adjusting-cone are properly united and slipped upon the axle, a double inclined surface is presented all around, this being brought about by the conical form of the cones, and of course it will be understood that the frame F or bearing-case which surrounds these parts has its interior inclining inwardly from each end, so as to conform to the contour mentioned and permit of the proper working of the bearing. (See u at Fig. 1.)

Having thus described my invention, what I claim as new, and desire to secure by Letters Patent, is—

1. In an adjustable bearing for bicycles and like vehicles, the combination, with the axle-sleeve formed of increased thickness for about one-half its length, so as to produce the enlarged portion d and reduced portion e, of the adjusting-cone screwing upon said enlarged portion, and the positive cone screwing upon said reduced portion, substantially as described.

2. In an adjustable bearing for bicycles and like vehicles, the combination, with the axle-sleeve formed with the enlarged and reduced portions, which are screw-threaded on their outer surfaces in opposite directions, of the positive cone screwing upon said reduced portion, and the adjusting-cone screwing upon the enlarged portion, and means for locking said adjusting-cone in positions of adjustment, substantially as described.

In testimony whereof I affix my signature in presence of two witnesses.

FRANK S. HODGMAN.

Witnesses:
  E. W. TOLESTON,
  CHAS. W. BOND.